Figure 1:
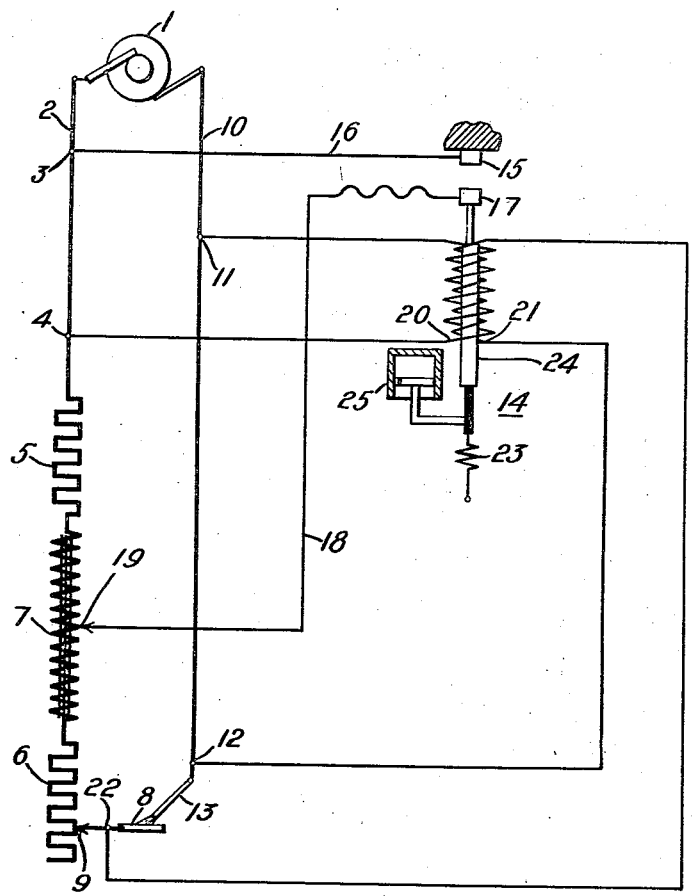

O. H. ESCHHOLZ.
ARC WELDING SYSTEM.
APPLICATION FILED FEB. 15, 1919.

1,374,557.

Patented Apr. 12, 1921.

WITNESSES:
H. J. Shelhamer
O. E. Bee.

INVENTOR
Otto H. Eschholz
BY
Wesley J. Carr
ATTORNEY

UNITED STATES PATENT OFFICE.

OTTO H. ESCHHOLZ, OF WILKINSBURG, PENNSYLVANIA, ASSIGNOR TO WESTINGHOUSE ELECTRIC & MANUFACTURING COMPANY, A CORPORATION OF PENNSYLVANIA.

ARC-WELDING SYSTEM.

1,374,557.          Specification of Letters Patent.     Patented Apr. 12, 1921.

Application filed February 15, 1919. Serial No. 277,328.

*To all whom it may concern:*

Be it known that I, OTTO H. ESCHHOLZ, a citizen of the United States, and a resident of Wilkinsburg, in the county of Allegheny and State of Pennsylvania, have invented a new and useful Improvement in Arc-Welding Systems, of which the following is a specification.

My invention relates to electric arc welding systems and more particularly to such systems employing alternating current. The primary object of my invention is to provide a system which shall facilitate welding with alternating current and, at the same time, insure satisfactory results.

While it has been found practicable to maintain a welding arc from an alternating-current, 110-volt, 60-cycle supply, with a series ballast resistance, difficulty has been encountered in starting the arc unless a very high arc current is utilized. A high arc current is necessary in establishing an arc on account of the fact that the work must be materially heated before an arc can be drawn. A suitable current value for starting the arc, if maintained, would result in a slow deposition of metal and melting through the weld scarf. In view of this, one object of my invention is to provide a welding system in which a suitable starting current may be employed and a desirable operating current automatically established after an arc has been drawn.

A still further object of my invention is to provide an arc welding system in which the starting current may be varied as desired and in which a welding current, of different value from the starting current but of any desired value for operating, may be employed.

With these and other objects in view, my invention will be more fully described, illustrated in the drawings, in the several views of which corresponding numerals indicate like parts, and then particularly pointed out in the claims.

Figures 2, 3:
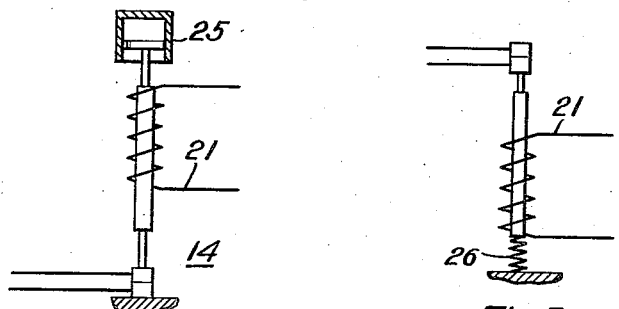

In the drawings, Figure 1 is a diagrammatic view of an electric-arc welding system embodying my invention; Fig. 2 is a fragmentary view of an electromagnetic switch which may be embodied in the system shown in Fig. 1, and Fig. 3 is a view, similar to Fig. 2, showing a modified form of switch which may be employed in my welding system.

In Fig. 1 is shown a welding system, embodying my invention, comprising a generator 1 or source of alternating current, one terminal of which may be connected to a conductor 2, having junction points 3 and 4, a plurality of non-inductive resistors 5 and 6 and an inductive reactance device 7, an electrode 8 being connected, through a movable contact 9, to the non-inductive resistor 6. The other terminal of the generator 1 may be connected to a conductor 10, which has junction points 11 and 12 and is connected to an electrode 13. An electromagnetic switch 14 has one stationary contact 15, which is connected to the junction point 3 of the conductor 2 by a lead 16, and a movable contact 17 which is connected to the inductive reactance device 7, by a lead 18, through a movable contact 19, and is adapted to be moved to its circuit-closing position by a switch-actuating coil 20 that is connected in parallel relation to the generator 1 at the junction points 4 and 11. A second switch-actuating coil 21 may be connected in parallel relation to the electrodes 8 and 13, as indicated at 12 and 22, and may be of such polarity as to oppose the action of the coil 20 when an arc is established to energize it. A spring 23 may be so connected to the core member 24 of the switch 14 as to continuously exert a force tending to maintain the switch in an open-circuit position. A retarding device 25, mechanically connected to the core member 24, may also be employed.

In operating the welding system above set forth, alternating current may be supplied by the generator 1 and may be regulated to have any desired initial value by adjusting the movable contact 19 that is connected to the movable contact member 17 of the switch 14. The coil 20, which is connected in parallel relation to the generator 1, exerts a magnetic force tending to close the switch immediately upon closing the welding circuit by disposing the electrodes 8 and 13 in engagement with each other. It will be apparent that the closing of the switch 14 shunts any selected part of the impedance in the main welding circuit and, therefore, permits the flow of a relatively heavy current from the generator 1. The electrodes are, therefore, subjected to momentary engagement and then slowly drawn apart to establish an arc which is facilitated by the heating of the work or electrodes by the heavy starting current. While the electrodes are in engagement the voltage across them is substantially zero and, therefore, the coil 21, connected in parallel relation to them, is substantially deënergized, but, immediately upon drawing an arc, by separating the electrodes, the coil 21 is energized, and, being oppositely connected, with respect to the coil 20, opposes the action of the coil 20 and tends to separate the contacts 15 and 17 of the switch 14. The opening of the switch 14 by the coil 21 may be accelerated to any desired extent by adjusting the relative forces exerted by the spring 23 and the dash-pot 25.

After the switch 14 has been opened, therefore, by establishing an arc between the electrodes, all of the impedance included between the movable contact 9 of the electrode 8 and the generator 1 is automatically inserted in series with the main welding circuit and, as a result, the operating current is reduced from the value of the starting current. Furthermore, the operating current may be adjusted to any desired value by means of the movable contact 9 connected to the electrode 8.

It is obvious that various devices may be employed in a welding circuit embodying my invention and, in order to illustrate some modifications which may be employed, I have shown a switch in Fig. 2 which is like the switch 14 employed in the welding circuit above described, with the exception that the closing coil of the switch is discarded by employing the force of gravity to close the switch and the coil 21 to open it. The retarding device 25 may be employed to secure a slight lapse of time between establishing the arc and the opening of the switch 14. Another form of switch which may be employed without utilizing a coil to close it is shown in Fig. 3. In this case, a spring 26 may be connected to the core of the switch to hold it in circuit-closing position, and the coil 21, supplemented by gravity, may be employed to open the switch and to maintain it in such position during welding operations.

Although I have described a welding system embodying my invention, it is obvious that minor changes may be made therein without departing from the spirit of my invention, and I desire, therefore, that no limitations shall be imposed except such as are indicated in the appended claims.

I claim as my invention:

1. An electric-arc welding system comprising means for providing a relatively high starting current and means for automatically reducing the starting current to a desirable operating value when an arc is established.

2. An electric-arc welding system comprising a source of alternating current, means for transmitting the current to electrodes and means for automatically inserting a predetermined amount of resistance into said transmitting means when an arc is established between the electrodes.

3. An electric-arc welding system comprising a main welding circuit including a variable impedance device and a plurality of electrodes connected in series with the impedance device and a starting circuit associated with the main welding circuit and including a switch normally shunting an adjustable portion of said impedance device.

4. An electric-arc welding system comprising a main welding circuit including a variable impedance device and a plurality of electrodes connected in series with the impedance device and a starting circuit associated with the main welding circuit and including a switch normally shunting an adjustable portion of said impedance device and means for opening the switch.

5. An electric-arc welding system comprising a main welding circuit including a variable impedance device and a plurality of electrodes connected in series with the impedance device and a starting circuit associated with the main welding circuit and including a switch normally shunting an adjustable portion of said impedance device and means for automatically opening the switch when an arc is established between the electrodes in the main welding circuit.

6. An electric-arc welding system comprising a main welding circuit including a variable impedance device and a plurality of electrodes connected in series with the impedance device, a starting circuit associated with the main welding circuit and including a switch normally held in a closed position to shunt an adjustable portion of said impedance device and a switch-actuating coil adapted to open the switch when an arc is established between the electrodes.

7. An electric-arc welding system comprising a source of alternating current, a switch connected in series with the source of current, a switch-actuating coil adapted to close the switch connected in parallel relation to the source of current, an impedance device connected in series with the current source and so connected to the switch that its opening and closing varies the amount of the impedance, welding electrodes connected in series with the current source, a second switch-actuating coil connected in parallel relation to the electrodes and adapted to oppose the action of the first coil when energized by the establishment of an arc between the electrodes and a spring so disposed as to exert a continuous force on the switch tending to maintain it in an open position.

8. An electric-arc welding system comprising a source of alternating current, a switch connected in series with the source of current, a retarding device for the switch, a switch-actuating coil adapted to close the switch connected in parallel relation to the source of current, an impedance device connected in series with the current source and so connected to the switch that its opening and closing varies the amount of the impedance, welding electrodes connected in series with the current source, a second switch-actuating coil connected in parallel relation to the electrodes and adapted to oppose the action of the first coil when energized by the establishment of an arc between the electrodes and a spring so disposed as to exert a continuous force on the switch tending to maintain it in an open position.

In testimony whereof I have hereunto subscribed my name this 23rd day of Jan., 1919.

OTTO H. ESCHHOLZ.